US008549984B2

(12) United States Patent
Arnold

(10) Patent No.: US 8,549,984 B2

(45) Date of Patent: Oct. 8, 2013

(54) APPARATUS TO INCREASE A FORCE OF AN ACTUATOR HAVING AN OVERRIDE APPARATUS

(75) Inventor: David Anthony Arnold, Marshalltown, IA (US)

(73) Assignee: Fisher Controls International, LLC, Marshalltown, IA (US)

( * ) Notice: Subject to any disclaimer, the term of this patent is extended or adjusted under 35 U.S.C. 154(b) by 943 days.

(21) Appl. No.: 12/648,135

(22) Filed: Dec. 28, 2009

(65) Prior Publication Data

US 2011/0155937 A1 Jun. 30, 2011

(51) Int. Cl.
*F16K 31/122* (2006.01)

(52) U.S. Cl.
USPC ............................................. 91/459; 251/14

(58) Field of Classification Search
USPC ............................................. 91/459; 251/14
See application file for complete search history.

(56) References Cited

U.S. PATENT DOCUMENTS

| | | | | |
|---|---|---|---|---|
| 3,482,777 | A | | 12/1969 | Quinn |
| 3,895,651 | A | | 7/1975 | Okada et al. |
| 4,295,630 | A | * | 10/1981 | Card et al. ...................... 91/459 |
| 4,568,058 | A | | 2/1986 | Shelton |
| 4,705,065 | A | | 11/1987 | McNeely et al. |
| 4,726,395 | A | | 2/1988 | Howes et al. |
| 4,934,652 | A | | 6/1990 | Golden |
| 5,067,323 | A | | 11/1991 | Bennett et al. |
| 5,348,036 | A | | 9/1994 | Oksanen et al. |
| 6,076,490 | A | * | 6/2000 | Esch et al. ................. 251/129.1 |
| 6,592,095 | B2 | | 7/2003 | Kabasin et al. |
| 6,684,897 | B2 | | 2/2004 | Sundararajan |
| 6,708,489 | B2 | | 3/2004 | Massey et al. |
| 6,807,895 | B2 | | 10/2004 | Hirano et al. |
| 7,744,060 | B2 | | 6/2010 | Sneh |
| 2008/0251146 | A1 | | 10/2008 | Folk |

FOREIGN PATENT DOCUMENTS

| | | |
|---|---|---|
| DE | 1187026 | 2/1965 |
| DE | 19933165 | 1/2001 |
| DE | 102004045011 | 4/2006 |
| DE | 102006028878 | 12/2007 |
| WO | 2007009077 | 1/2007 |

OTHER PUBLICATIONS

United States Patent and Trademark Office, "Non-Final Office Action," issued in connection with U.S. Appl. No. 12/360,678, mailed Oct. 26, 2011, 14 pages.

(Continued)

*Primary Examiner* — Thomas E Lazo

(74) *Attorney, Agent, or Firm* — Hanley, Flight & Zimmerman, LLC.

(57) ABSTRACT

Apparatus to increase a force of an actuator having an override apparatus are described herein. An example fluid control system includes a first fluid control apparatus to fluidly couple a control fluid supply source to a control actuator via a first passageway. The control fluid supply source provides a control fluid to move a control actuator member of the control actuator in a first direction or a second direction opposite the first direction when the control actuator is in the operational state. A second fluid control apparatus is in fluid communication with the first fluid control apparatus and is configured to fluidly couple an override actuator to the control actuator via a second passageway when the control actuator is in a non-operational state. The override actuator is operatively coupled to the control actuator.

20 Claims, 6 Drawing Sheets

(56) References Cited

OTHER PUBLICATIONS

Emerson Process Management, "377 Series Trip Valves," Product Bulletin, published May 2006, 8 pages.
Emerson Process Management, "Fisher Sliding-Stem Control Valves," Product Bulletin, published May 2007, 11 pages.
Emerson Process Management, "GVO Series Pneumatic Linear Valve Operators," Bettis Brochure, published Oct. 2007, 20 pages.
Flowserve, "Valtek Spring Cylinder Linear Actuators," published 2006, 12 pages.
International Searching Authority, "International Search Report," issued in connection with international application serial No. PCT/US2010/056406, mailed Mar. 3, 2011, 3 pages.
International Searching Authrotiy, "Written Opinion of the International Searching Authority," issued in connection with international application serial No. PCT/US2010/056406, mailed Mar. 3, 2011, 7 pages.
International Bureau, "International Preliminary Report on Patentability," issued in connection with international application serial No. PCT/US2010/056406, mailed Jul. 12, 2012, 8 pages.
United States Patent and Trademark Office, "Final Office Action," issued in connection with U.S. Appl. No. 12/360,678, mailed Aug. 27, 2012, 27 pages.
International Searching Authority, "International Search Report," issued in connection with international application serial No. PCT/US2009/069794, mailed Apr. 8, 2010, 4 pages.
International Searching Authority, "Written Opinion of the International Searching Authority," issued in connection with international application serial No. PCT/US2009/069794, mailed Apr. 8, 2010, 5 pages.
United States Patent and Trademark Office, "Non-Final Office Action," issued in connection with U.S. Appl. No. 12/360,678, mailed Apr. 12, 2013, 47 pages.

* cited by examiner

APPARATUS TO INCREASE A FORCE OF AN ACTUATOR HAVING AN OVERRIDE APPARATUS

FIELD OF THE DISCLOSURE

The present disclosure relates generally to actuators and, more particularly, to apparatus to increase a force of an actuator having an override apparatus.

BACKGROUND

Control valves (e.g., sliding stem valves, rotary valves, etc.) are commonly used in process control systems to control the flow of process fluids. Sliding stem valves such as, for example, gate valves, globe valves, etc., typically have a valve stem (e.g., a sliding stem) that moves a flow control member (e.g., a valve plug) disposed in a fluid path between an open position to allow fluid flow through the valve and a closed position to prevent fluid flow through the valve. A control valve typically includes an actuator (e.g., a pneumatic actuator, hydraulic actuator, etc.) to automate the control valve. In operation, a control unit (e.g., a positioner) supplies a control fluid (e.g., air) to the actuator to position the flow control member to a desired position to regulate the flow of fluid through the valve. The actuator may move the flow control member through a complete stroke between a fully closed position to prevent fluid flow through the valve and a fully open position to allow fluid flow through the valve.

In practice, many control valves are implemented with fail-safe or override systems. A fail-safe override system typically provides protection to a process control system by causing the actuator and, thus, the flow control member to move to either a fully closed or a fully open position during emergency situations, power failures, and/or if the control fluid (e.g., air) supply to an actuator (e.g., a pneumatic actuator) is shut down.

At the closed position, the flow control member engages a valve seat disposed within the valve to prevent fluid flow through the valve. In the closed position, the actuator provides a force to impart a seat load to the flow control member to maintain the flow control member in sealing engagement with the valve seat. In high pressure applications (e.g., high pressure process fluid at an inlet of the valve), the seat load provided by the actuator may be insufficient to maintain the flow control member in sealing engagement with the valve seat, thereby resulting in undesired leakage through the valve. Providing an adequate or sufficient seat load or opening force is particularly important when the valve is in a failed position. In a failed position, the actuator causes the flow control member to move to a predetermined position (e.g., the fully closed position, the fully open position).

Air-based (e.g., pneumatic) fail-safe systems are often implemented with double-acting control actuators to provide a fail-safe or override mechanism. In operation, air-based (e.g., pneumatic) fail-safe systems may be configured to compensate for the lack of sufficient force (e.g., seat load or opening force) provided by an actuator. However, such known air-based fail-safe systems require additional components (e.g., volume tanks, trip valves/switching valves, volume boosters, etc.), thereby significantly increasing complexity and costs.

Other known actuators (e.g., spring-return actuators) provide a mechanical fail-safe mechanism. These known actuators may use an internal spring in direct contact with a piston to provide a mechanical fail-safe to bias the piston to one end of the stroke travel (e.g., fully opened or fully closed) when the control fluid supply to the actuator fails. However, when used with long-stroke applications (e.g., stroke lengths of four (4) inches or more), such long-stroke spring-return actuators often provide poor control. That is, in some applications, the spring rate of the bias or fail-safe spring may be sufficient to degrade actuator performance because the supply fluid and the control member must overcome the bias force of the fail-safe spring. In practice, long-stroke actuators often use a return spring having a smaller or lower spring rate to accommodate the long-stroke length (i.e., so that the spring can compress the length of the stroke). However, in these long-stroke actuators, the lower spring rate often results in insufficient seat load or force to cause the flow control member to sealingly engage a valve seat to prevent leakage through the valve (or to fully open to allow fluid flow through the valve) upon a system failure, thereby providing an inadequate fail-safe system.

SUMMARY

In one example, an example fluid control system for use with valves includes a first fluid control apparatus to fluidly couple a control fluid supply source to a control actuator via a first passageway. The control fluid supply source provides a control fluid to move a control actuator member of the control actuator in a first direction or a second direction opposite the first direction when the control actuator is in the operational state. A second fluid control apparatus is in fluid communication with the first fluid control apparatus and is configured to fluidly couple an override actuator to the control actuator via a second passageway when the control actuator is in a non-operational state. The override actuator is operatively coupled to the control actuator.

In another example, an example fluid control system described herein includes a passageway to fluidly couple a control fluid to a control actuator and to an override actuator operatively coupled to the control actuator such that the control fluid causes the override actuator to move to a stored position and causes the control actuator to move between a first position and a second position when the control actuator is in an operational state. A fluid control apparatus is coupled to the passageway to prevent fluid flow between the control actuator and the override actuator when the control actuator is in the operational state and to fluidly couple the override actuator to the control actuator to enable fluid flow between the control actuator and the override actuator when the control actuator is in a non-operational state so that the control fluid from the override actuator acts upon the control actuator to increase a force provided by the control actuator when the control actuator is in a non-operational state.

In yet another example, a fluid control system described herein includes first means for fluidly coupling a pressurized control fluid to a control actuator when the control actuator is in an operational state such that the control fluid is to cause the control actuator to move between a first position and a second position. The system also includes second means for fluidly coupling the pressurized control fluid to an override apparatus to cause the override apparatus to move to a stored position when the control actuator is in the operational state. Further, the second means for fluidly coupling selectively enables fluid flow from the override apparatus to the first means for fluidly coupling and the first means for fluidly coupling selectively enables fluid flow from second means for fluidly coupling to the control actuator when the control actuator is in a non-operational state.

DETAILED DESCRIPTION

The example systems and apparatus described herein increase a force (e.g., a seat load or opening force) imparted by a control actuator on, for example, a flow control member of a valve when the control actuator is in a non-operational state. Further, the example systems and apparatus described herein provide a substantially closed system between a control actuator and an override apparatus (e.g., by substantially preventing release of the control fluid from the control actuator) when the control actuator is in a non-operational state. Thus, the example systems and apparatus described herein can provide the increased force imparted on the flow control member for a significant or extended period of time when the control actuator is in the non-operational condition.

Additionally, the example apparatus described herein provide an override or fail-safe control apparatus that does not require the complex and costly components associated with known fail-safe systems such as those noted above. Although the example apparatus described herein may accommodate any valve stroke length and application (e.g., on/off applications, throttling applications, etc.), the example apparatus described herein are particularly advantageous for use in throttling applications with fluid control devices (e.g., valves) having long-stroke lengths (e.g., greater than 8 inches).

Figure 1B:
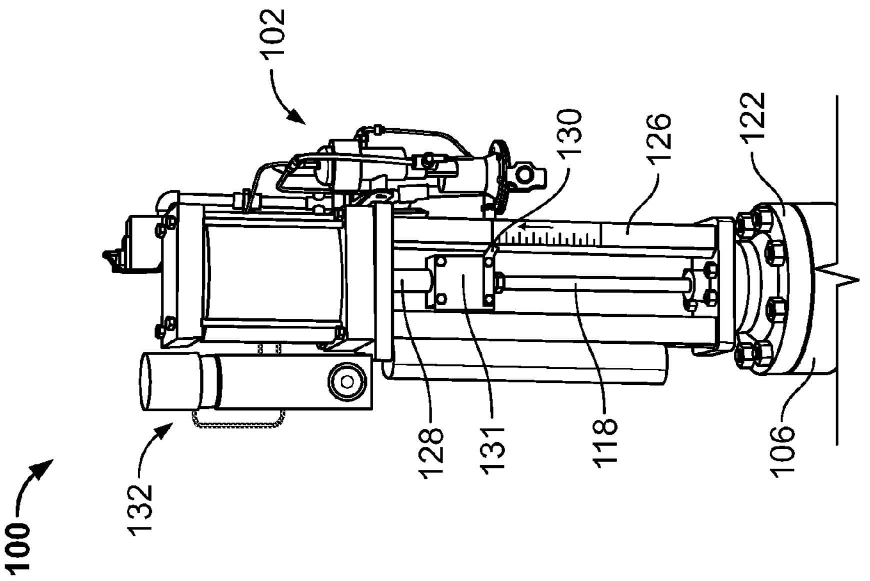
FIG. 1B (Prior Art)
FIGS. 1A, 1B, and 1C illustrate a known control valve and actuator having an air-based fail-safe system.
Figure 1A:
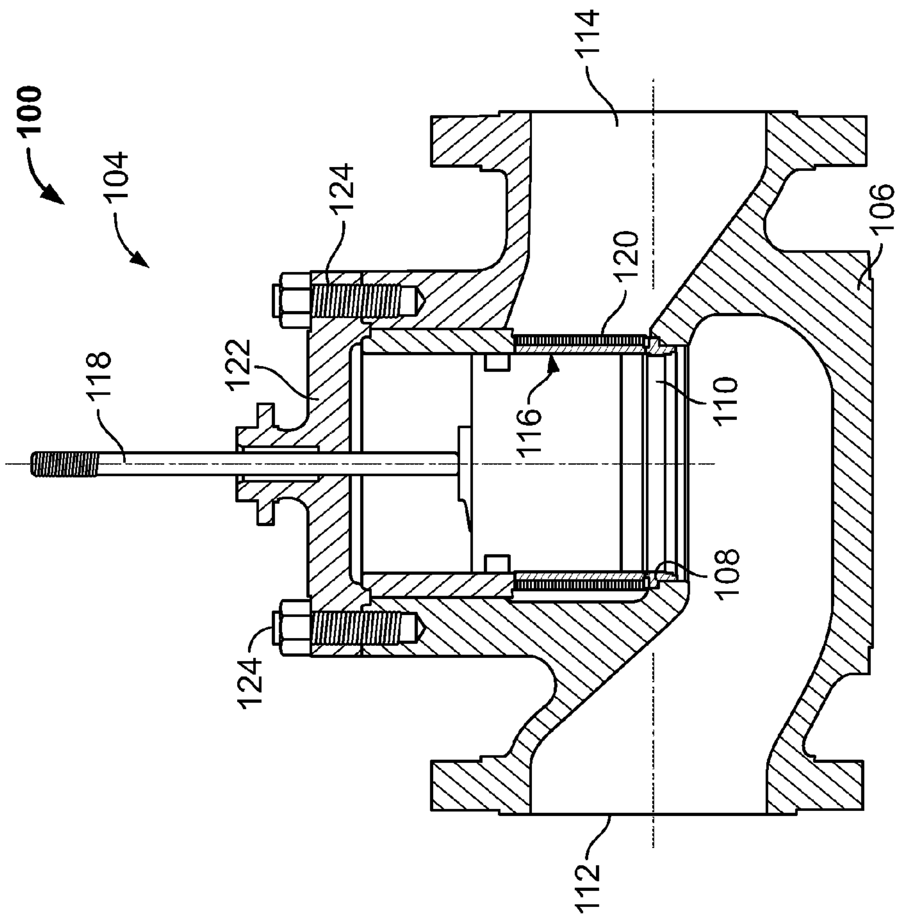
FIG. 1A (Prior Art)
Figure 1C:
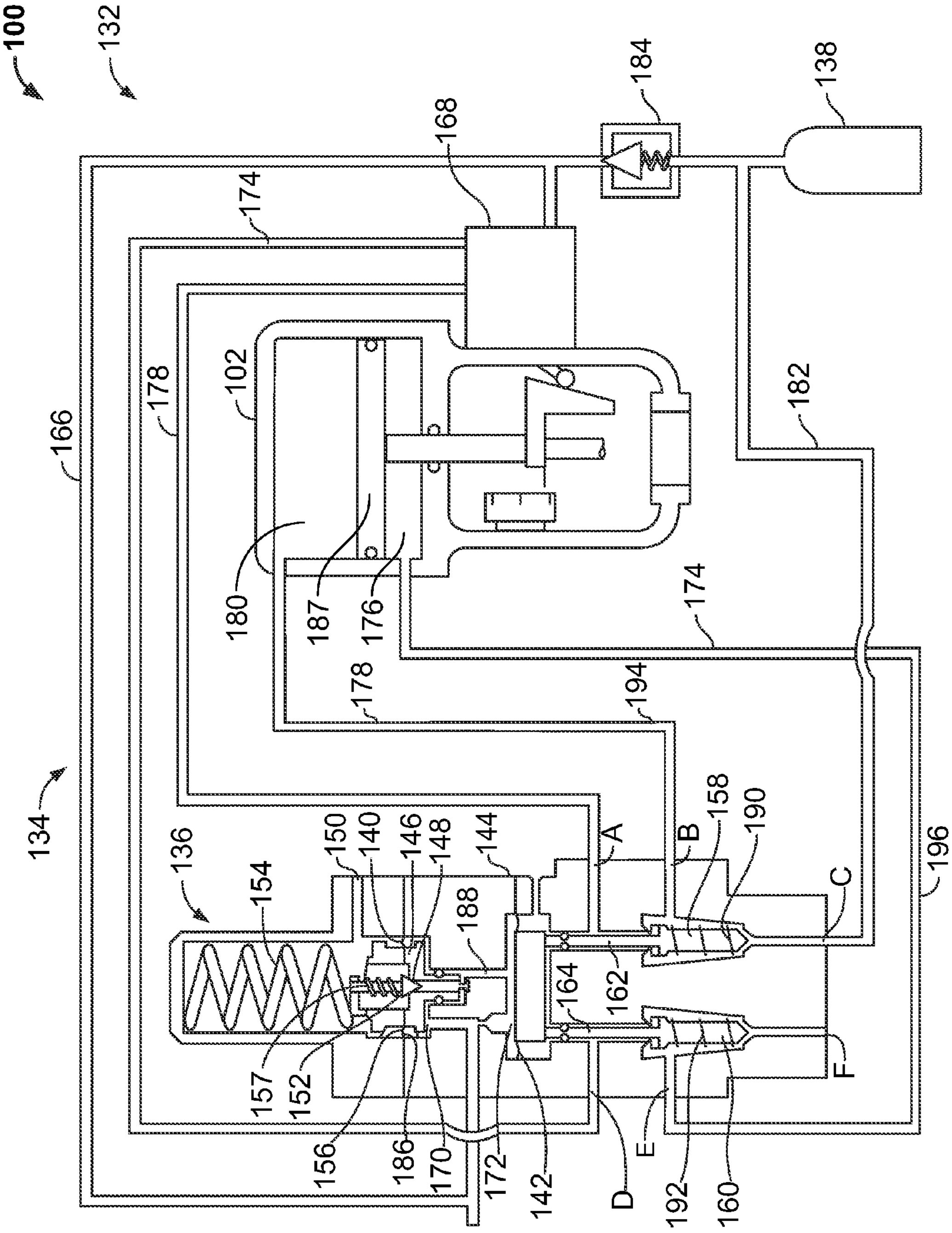
FIG. 1C (Prior Art)

Before describing the example apparatus in greater detail, a brief discussion of a known control valve assembly 100 is provided in connection with FIGS. 1A, 1B, and 1C. Referring to FIGS. 1A and 1B, the known control valve assembly 100 includes an actuator 102 to stroke or operate a valve 104. As shown in FIG. 1A, the valve 104 includes a valve body 106 having a valve seat 108 disposed therein to define an orifice 110 that provides a fluid flow passageway between an inlet 112 and an outlet 114. A flow control member 116 operatively coupled to a valve stem 118 moves in a first direction (e.g., away from the valve seat 108 in the orientation of FIG. 1A) to allow fluid flow between the inlet 112 and the outlet 114 and moves in a second direction (e.g., toward the valve seat 108 in the orientation of FIG. 1A) to restrict or prevent fluid flow between the inlet 112 and the outlet 114. Thus, the flow rate permitted through the control valve 100 is controlled by the position of the flow control member 116 relative to the valve seat 108. A cage 120 slidably receives the flow control member 116 and is disposed between the inlet 112 and the outlet 114 to impart certain flow characteristics to the fluid (e.g., to control capacity, reduce noise, reduce cavitation, etc.). A bonnet 122 is coupled to the valve body 106 via fasteners 124 and couples the valve 104 to a yoke 126 of the actuator 102.

The actuator 102 shown in FIG. 1B is commonly referred to as a double-acting piston actuator. The actuator 102 includes a piston (not shown) operatively coupled to the flow control member 116 (FIG. 1A) via an actuator stem 128. A stem connector 131 may be coupled to the actuator stem 128 and the valve stem 118 and may include a travel indicator 130 to indicate the position of the actuator 102 and, thus, the position of the flow control member 116 relative to the valve seat 108 (e.g., an open position, a closed position, an intermediate position, etc.). The example control valve assembly 100 of FIGS. 1A and 1B includes a fail-safe system 132. The fail-safe system 132 provides protection to a process control system by causing the flow control member 116 to move to a desired position during emergency situations (e.g., if a control unit fails to provide control fluid to the actuator 102).

FIG. 1C illustrates a known fluid control system 134 to implement the fail-safe system 132. In this example, the fail-safe system 132 is an air-based fail-safe system that includes a trip valve 136 in fluid communication with the actuator 102 and a volume tank 138. The trip valve 136 includes a first or upper diaphragm 140 and a lower diaphragm 142 disposed within a housing 144 of the trip valve 136. The upper diaphragm 140 is operatively coupled to a valve seat 146 having an aperture 148 therethrough to provide a fluid passage to an exhaust port 150. A first flow control member 152 engages the valve seat 146 to prevent fluid flow through the aperture 148 and moves away from the valve seat 146 to allow fluid flow through the aperture 148. A control spring 154 biases a first side 156 of the diaphragm 140 toward the lower diaphragm 142 (in the orientation of FIG. 1C) and a valve plug spring 157 biases the first flow control member 152 toward the valve seat 146.

The trip valve 136 includes a second fluid control member 158 and a third fluid control member 160 disposed within the housing 144 and operatively coupled to the lower diaphragm 142 via respective stems 162 and 164. The second fluid control member 158 moves between a first position to enable fluid flow between a port A and a port B and prevent fluid flow through a port C, and a second position to enable fluid flow between the port B and the port C and prevent fluid flow through the port A. Likewise, the third flow control member 160 moves between a first position to enable fluid flow between a port D and a port E and prevent fluid flow through a port F, and a second position to enable fluid flow between the port E and the port F and prevent fluid flow through the port D.

A first passageway 166 fluidly couples a control fluid from a control fluid supply source (not shown) to a lower chamber 170 of the trip valve 136 in fluid communication with the upper diaphragm 140 and an upper chamber 172 of the trip valve 136 in fluid communication with the lower diaphragm 142. The first passageway 166 also fluidly couples the control fluid to a control unit or positioner 168. A second passageway 174 fluidly couples the control fluid from the positioner 168 to a first or lower chamber 176 of the actuator 102 via ports D and E. A third passageway 178 fluidly couples the control fluid from the positioner 168 to a second or upper chamber 180 of the actuator 120 via ports A and B. A fourth passageway 182 fluidly couples the volume tank 138 to the upper chamber 180 of the actuator 102 via ports C and B.

The volume tank 138 is fluidly coupled to the control fluid supply source via the first passageway 166 and stores pressurized control fluid when the actuator 102 is in an operational state (i.e., when the control fluid supply source provides pressurized control fluid to the actuator 102). A check valve 184 is disposed between the first passageway 166 and the volume tank 138 to prevent pressurized control fluid in the volume tank 138 from flowing in the first passageway 166 when the pressure of the control fluid in the volume tank 138 is greater than the pressure of the control fluid in the first passageway 166.

In operation, referring to FIGS. 1A-1C, the control fluid supply source provides control fluid to the positioner 168 via the first passageway 166 and loads the lower and upper chambers 170 and 172 of the trip valve 136. The pressure of the control fluid exerts a force on a second side 186 of the upper diaphragm 140 that is greater than the force exerted on the first side 156 of the upper diaphragm 140 via the control spring 154 and causes the flow control member 152 to engage the valve seat 146 to prevent fluid flow through the exhaust port 150. Additionally, the control fluid in the upper chamber 172 causes the lower diaphragm 142 and, thus, the second and third flow control members 158 and 160 to move toward the respective ports C and F to prevent fluid flow through the ports C and F and enable fluid flow through ports A and B and C and D. In this manner, the control fluid from the positioner 168 flows to the upper chamber 180 of the actuator 102 via the third passageway 178 and the ports A and B and control fluid from the positioner 168 flows to the lower chamber 176 of the actuator 102 via the second passageway 174 and the ports D and E.

The positioner 168 may be operatively coupled to a feedback sensor (not shown) via a servo to control the amount of control fluid to be supplied above and/or below a piston 187 of the actuator 102 based on the signal provided by the feedback sensor. As a result, the pressure differential across the piston 187 moves the piston 187 in either a first direction or a second direction to vary the position of the flow control member 116 between a closed position at which the flow control member 116 is in sealing engagement with the valve seat 108 and a fully open or maximum flow rate position at which the flow control member 116 is spaced or separated from the valve seat 108. Additionally, during operation, the control fluid supply source provides pressurized control fluid to the volume tank 138 via the first passageway 166.

The trip valve 136 senses the pressure of the control fluid provided by the control fluid supply source. If the pressure of the control fluid falls below a predetermined value (e.g., a value set via the control spring 154), the trip valve 136 provides a closed system and fluidly couples the volume tank 138 to the actuator 102.

For example, if the control fluid supply source fails, the upper and lower chambers 170 and 172 of the trip valve 136 are no longer loaded by the control fluid. In this case, the control spring 154 causes the upper diaphragm 140 and, thus, the flow control member 152 to move away from the valve seat 146 to allow fluid flow through the exhaust port 150. As a result, the control fluid in the upper chamber 172 is vented through the exhaust port 150 via a passage 188 and through the aperture 148. When the fluid in the upper chamber 172 is exhausted, springs 190 and 192 operatively coupled to the respective second and third flow control members 158 and 160 cause the flow control members 158 and 160 to move to the second position (i.e., away from the respective ports C and F), thereby blocking fluid flow through the respective ports A and D.

When the second flow control member 158 is at the second position, the ports C and B fluidly couple the volume tank 138 to the upper chamber 180 of the actuator 102 via the fourth passageway 182 and a first portion 194 of the third passageway 178. Also, when the third flow control member 160 is at the second position, ports E and F fluidly couple the lower chamber 176 of the actuator 102 to atmospheric pressure via port F and a first portion 196 of the second passageway 174. The volume tank 138 supplies the stored pressurized control fluid to the actuator 102 to move the flow control member 116 to the open position, the closed position, or an intermediate position. Alternatively, the volume tank 138 may be removed and the ports C and F may be blocked (e.g., via a plug) so that at the fail position, the trip valve 136 causes the actuator 102 to lock or hold the flow control member 116 in the last control position.

Although the air-based fail-safe system 132 is very effective, the air-based fail-safe system 132 is complex to install, requires additional piping, space requirements, maintenance, etc., thereby increasing costs. Furthermore, the volume tank 138 used with the air-based fail-safe system 132 typically requires periodic certification (e.g., a yearly certification) because it is often classified as a pressure vessel, which results in additional expenditure and time. Additionally, the fail-safe system 132 does not provide a primary (e.g., a spring-based) mechanical fail-safe, which may be desired or required in some applications.

In other examples, long-stroke actuators may include a bias or fail spring operatively coupled to an actuation member (e.g., a piston) of the actuator 102 to provide a primary mechanical fail-safe. However, such bias springs typically lack sufficient thrust or force (e.g., fail to provide adequate seat load) to cause the flow control member 116 to sealingly engage the valve seat 108 upon loss or failure of control fluid to the actuator 102. Thus, such known bias springs typically require a supplemental fail-safe system such as, for example, the fail-safe system 132.

Figure 2:
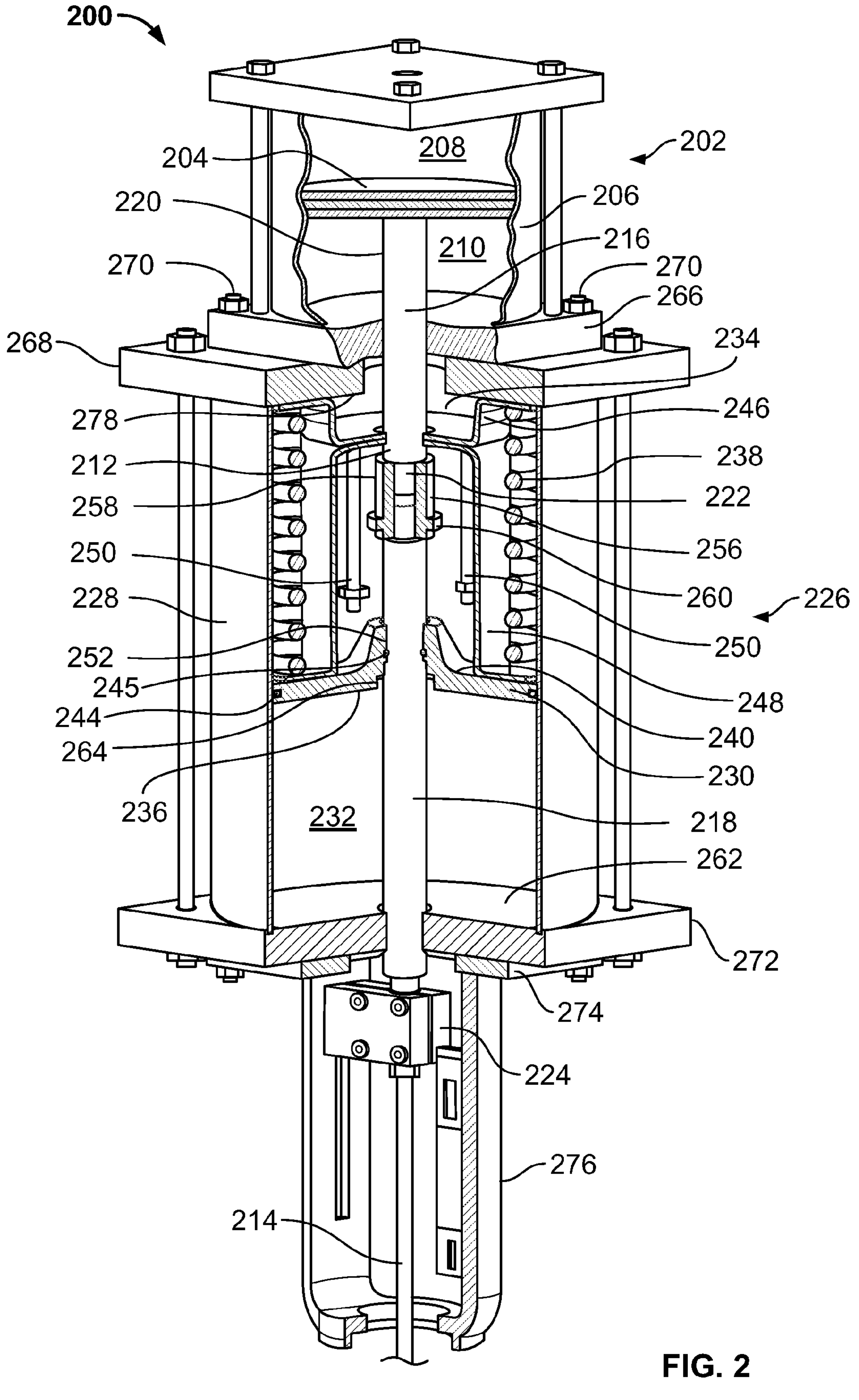
FIG. 2 illustrates an example actuator apparatus described herein.

FIG. 2 illustrates an example actuator apparatus 200 that may be used with the example systems or apparatus described herein. The example actuator apparatus 200 may be used to operate or drive fluid control devices such as, for example, sliding stem valves (e.g., gate valves, globe valves, etc.), rotary valves (e.g., butterfly valves, ball valves, disk valves, etc.), and/or any other flow control device or apparatus. For example, the example actuator apparatus 200 of FIG. 2 may be used to operate or drive the example valve 104 of FIG. 1A.

In this example, the actuator apparatus 200 includes a first or control actuator 202 configured as a double-acting actuator. In other examples, the control actuator 202 may be a spring-return actuator or any other suitable actuator. The control actuator 202 includes a control actuation member 204 (e.g., a piston or diaphragm) disposed within a housing 206 to define a first chamber 208 and a second chamber 210. The first and second chambers 208 and 210 receive a control fluid (e.g., pressurized air) to move the control actuation member 204 in a first or second direction based on the pressure differential across the control actuation member 204 created by the control fluid in the first and second chambers 208 and 210. The control actuator 202 includes a stem 212 to be operatively coupled to, for example, a flow control member (e.g., the flow control member 116 of FIG. 1A) of a valve (e.g., the valve 104 of FIG. 1A) via a valve stem 214.

As shown, the actuator stem 212 includes a first actuator stem portion 216 coupled to a second actuator stem portion 218. In other examples, the actuator stem 212 may be a unitary or single piece structure. The first actuator stem portion 216 is coupled to the control actuation member 204 at a first end 220 and is coupled to the second actuator stem portion 218 at a second end 222. A travel indicator 224 may be coupled to the second actuator stem portion 218 and the valve stem 214 to determine the position of the control actuation member 204 and, thus, the position of a flow control member relative to a valve seat (e.g., the valve seat 108 of FIG. 1A) (e.g., an open position, a closed position, an intermediate position, etc.).

Figure 3:
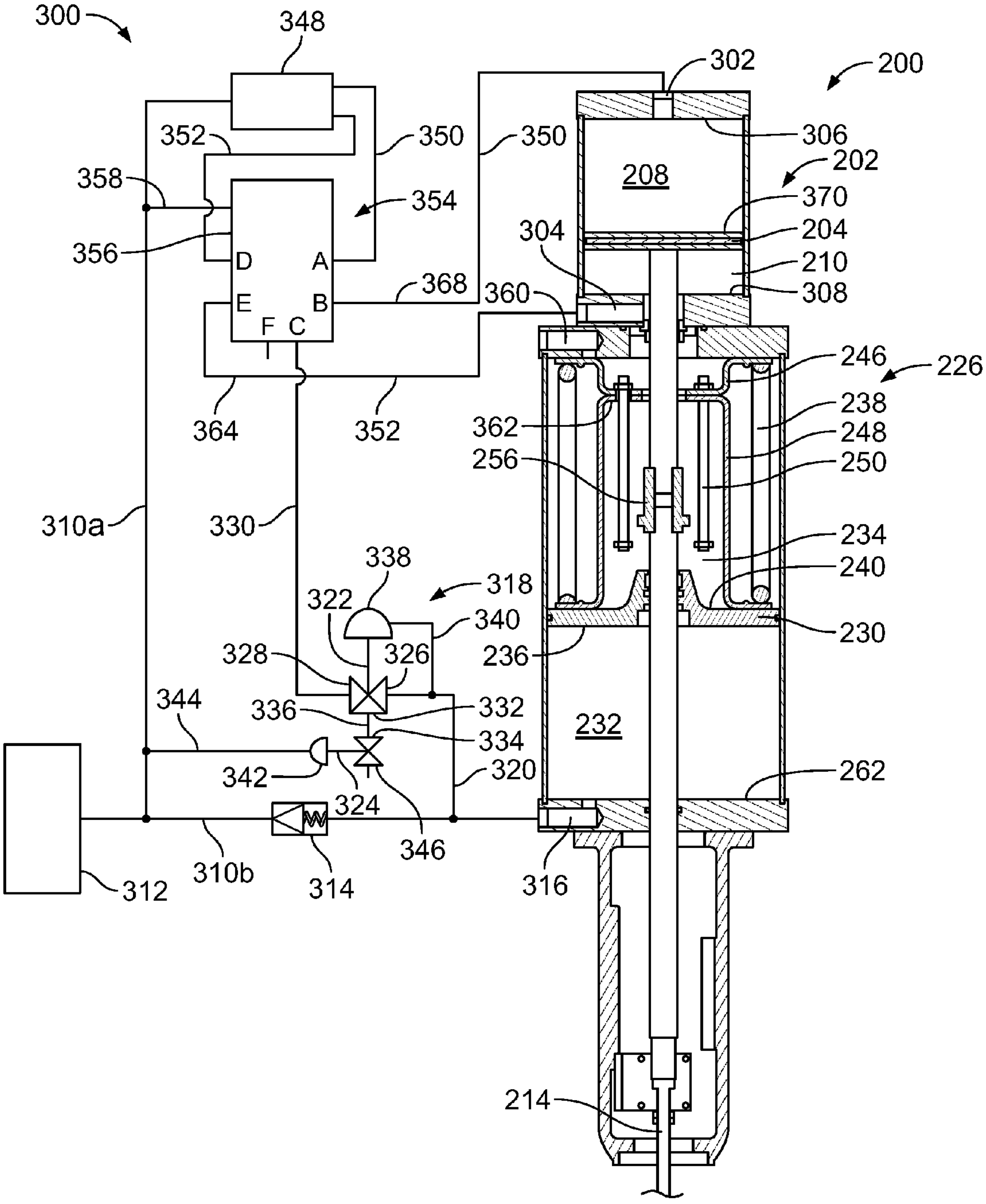
FIG. 3 is a cross-sectional view of the example actuator apparatus of FIG. 2 implemented with an example fluid control system described herein and depicting the actuator apparatus in an operational state.

The example actuator apparatus 200 also includes a second actuator or override apparatus 226. As shown, the override apparatus 226 includes a housing 228 having an override actuation member 230 (e.g., a piston, a diaphragm plate, etc.) disposed therein to define a third chamber 232 and a fourth chamber 234. The third chamber 232 is to receive a control fluid (e.g., pressurized air, hydraulic oil, etc.) to exert a force on a first side 236 of the override actuation member 230 to cause the override actuation member 230 to move in a first direction or to hold the override actuation member 230 in a stored position (e.g., as shown in FIGS. 2-3).

Figure 4:
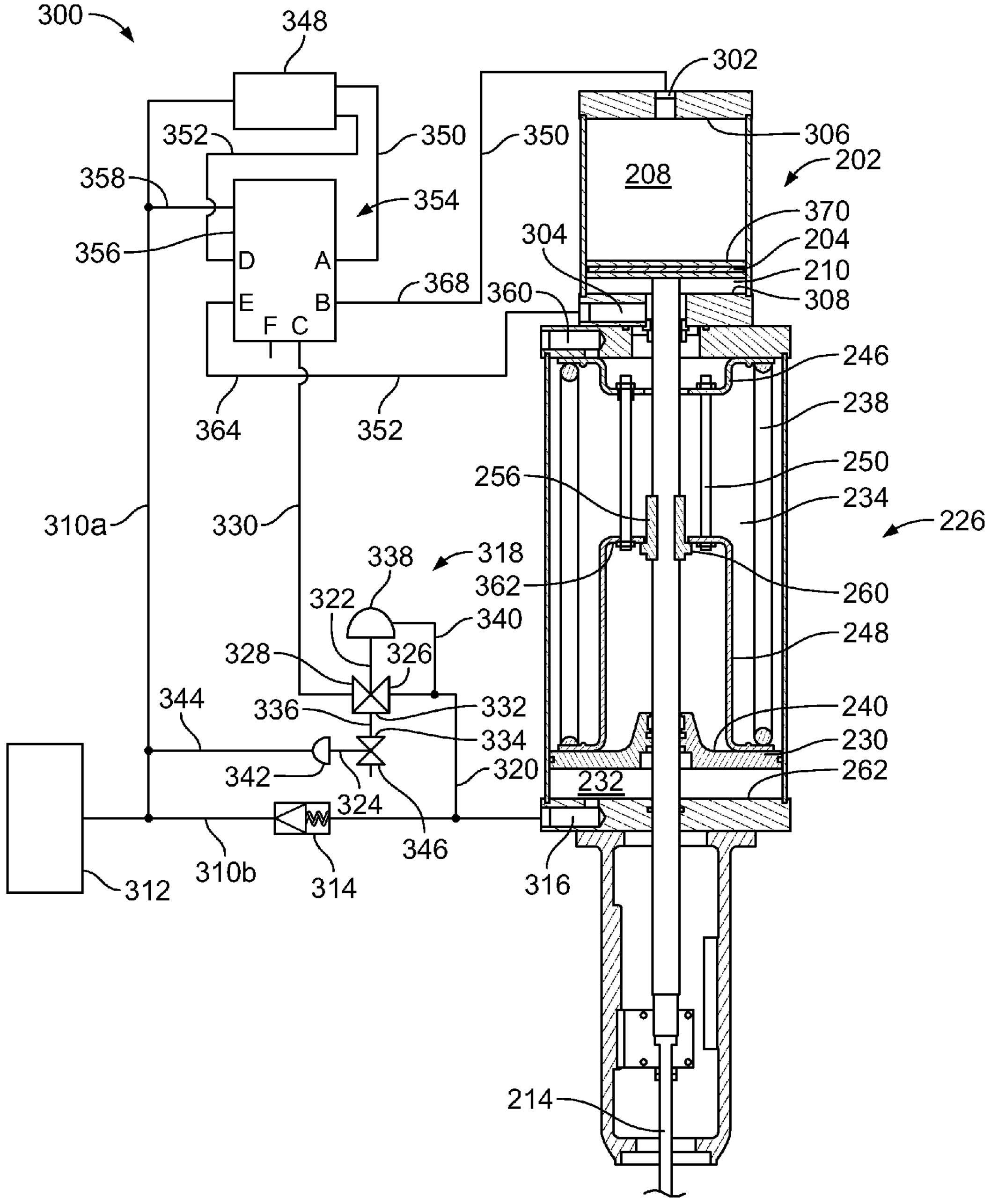
FIG. 4 is another cross-sectional view of the example actuator apparatus of FIGS. 2 and 3 depicting the actuator apparatus in a non-operational state.
Figure 5:
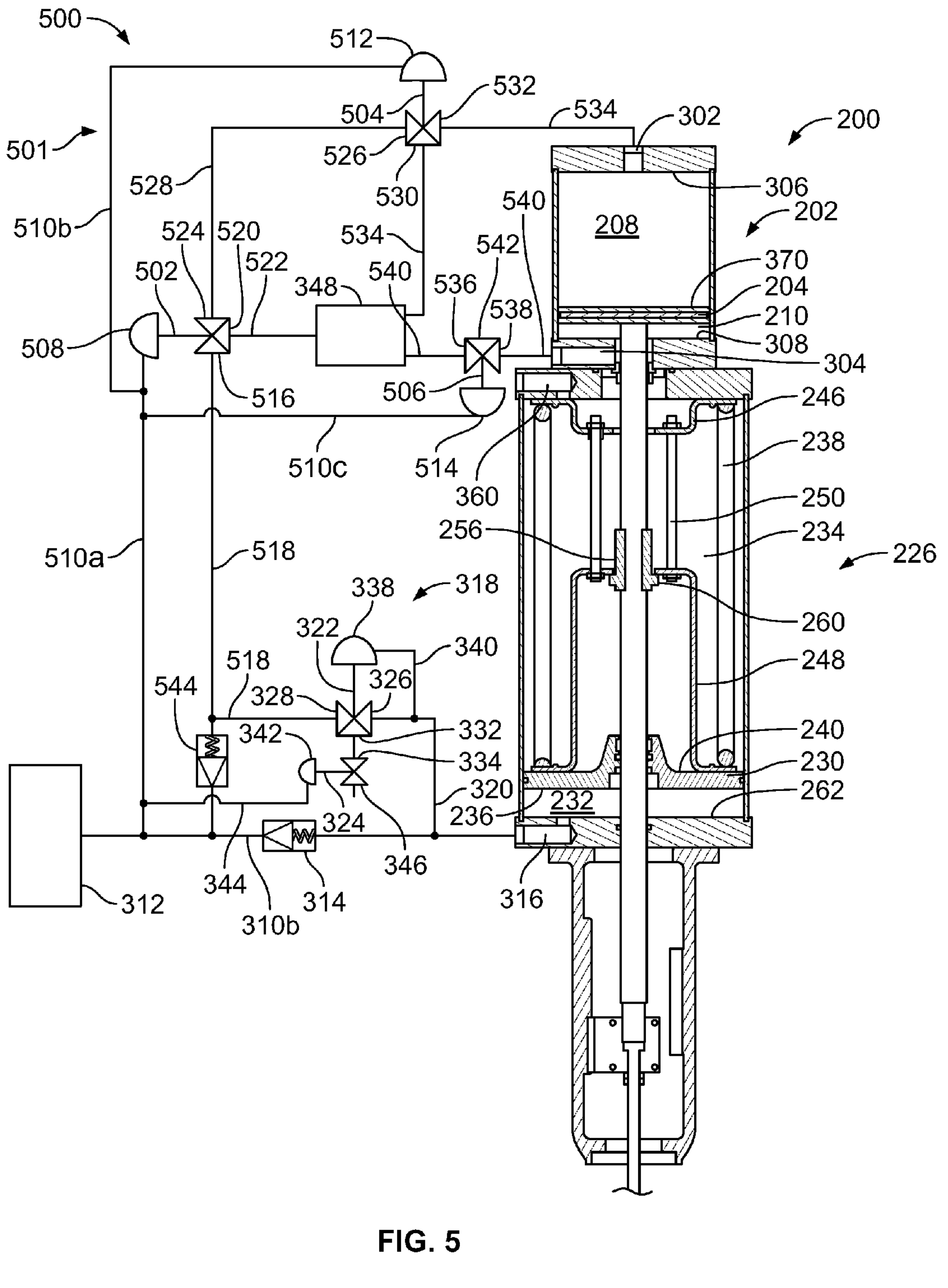
FIG. 5 illustrates the example actuator apparatus of FIG. 2 implemented with another example fluid control system described herein.

A biasing element 238 (e.g., a spring) is disposed in the fourth chamber 234 to bias the override actuation member 230 in a second direction opposite the first direction so that when the pressure of the control fluid in the third chamber 232 exerts a force on the first side 236 that is less than the force exerted by the biasing element 238 on a second side or surface 240 of the override actuation member 230 (e.g., when the control fluid in the third chamber 232 is removed), the override actuation member 230 moves in the second direction. In other words, the override actuation member 230 moves to a predetermined position (e.g., as depicted in FIGS. 4-5) in response to a control fluid supply source failing to provide control fluid to the third chamber 232. Also, the override actuation member 230 may include circumferential seals 244 and 245 (e.g., O-rings) to at least partially define the third chamber 232 and prevent control fluid in the third chamber 232 from leaking to the fourth chamber 234.

In the example of FIG. 2, the biasing element 238 is illustrated as a spring disposed between a spring seat 246 and a spring retention canister 248. The override actuation member 230, the biasing element 238, the spring seat 246, and the canister 248 may be pre-assembled to a height substantially equal to a height or size of the housing 228. In this manner, the canister 248 facilitates assembly and maintenance of the example actuator apparatus 200 by preventing the biasing element 238 from exiting the housing 228 during disassembly for maintenance or repairs. The canister 248 is slidably coupled to the spring seat 246 via rods 250 (e.g., bolts) so that the canister 248 moves along (e.g., slides) with the override actuation member 230 when the biasing element 238 is compressed or extends.

In this example, the override actuation member 230 is depicted as a piston having an aperture 252 to slidably receive the actuator stem 212. In other examples, the override actuation member 230 may be a diaphragm or any other suitable actuation member.

The example actuator apparatus 200 also includes a connector or coupling member 256. In the illustrated example, the coupling member 256 couples the first actuator stem portion 216 and the second actuator stem portion 218. The coupling member 256 has a cylindrical body 258 having a lip portion or annular protruding member 260. As described in greater detail below, the coupling member 256 is to engage a portion of the override apparatus 226 in response to a control fluid supply source failure (i.e., when the control actuator 202 is in a non-operational state). For example, as shown, the coupling member 256 is disposed between the spring seat 246 and the override actuation member 230 so that the lip portion 260 is to engage the canister 248 to operatively couple the override actuation member 230 and the control actuation member 204 when the control actuator 202 is in a non-operational state. However in other examples, the coupling member 256 may be disposed between the override actuation member 230 and a surface 262 of the housing 228 so that the lip portion 260 is to engage the override actuation member 230 to cause the control actuation member 204 to move toward the surface 262 when the control actuator 202 is in the non-operational state.

In other examples, the coupling member 256 may be integrally formed with the actuator stem 212 as a unitary or single piece or structure. In other examples, the actuator stem 212 may include a flanged end to engage the override actuation member 230 and/or the canister 248. In yet other examples, the coupling member 256 may be any other suitable shape and/or may be any suitable connector that operatively and selectively couples the control actuation member 204 and the override actuation member 230 when the control actuator 202 is in the non-operational state.

As shown, a flange 266 of the housing 206 is coupled to a first flange 268 of the housing 228 via fasteners 270. However, in other examples, the flange 266 and the flange 268 may be integrally formed as a unitary piece or structure. Similarly, the housing 228 includes a second flange 272 to couple the housing 228 to a flange 274 of, for example, a bonnet or yoke member 276. However, in other examples, the flanges 272 and 274 may be integrally formed as a single piece or structure.

The example actuator apparatus 200 of FIG. 2 provides a fail-to-close configuration when coupled to a valve such as, for example, the valve 104 of FIG. 1A. A fail-to-close configuration causes the flow control member 116 to sealingly engage the valve seat 108 (e.g., a close position) to prevent the flow of fluid through the valve 104. In other words, the example actuator apparatus 200 (when coupled to the valve 104) is configured so that in the predetermined position, the actuator apparatus 200 causes the flow control member 116 to move toward the valve seat 108 to prevent the flow of fluid through the valve 104. However, in other examples, the example actuator apparatus 200 may be configured as a fail-to-open actuator. In a fail-to-open configuration, the actuator apparatus 200 may be configured so that in the predetermined or fail position (e.g., a fully open position), the actuator apparatus 200 causes the control member 116 to move away from the valve seat 108 to allow fluid flow through the valve 104 and/or any other suitable or desired intermediate position.

In a fail-to-open configuration, the orientation of the override actuation member 230, the spring seat 246, the biasing element 238, and the canister 248 may be reversed (e.g., flipped) relative to the orientation shown in FIG. 2. In this configuration, the coupling member 256 may be disposed between the override actuation member 230 and a surface 278 of the housing 228 so that the coupling member 256 (e.g., the lip portion 260) engages the override actuation member 230 (e.g., via a recessed portion 264) to operatively couple the override actuation member 230 to the control actuation member 204 when the control actuator 202 is in the non-operational state. Such example configurations are described in U.S. patent application Ser. No. 12/360,678, filed on Jan. 27, 2009, which is incorporated herein by reference in its entirety.

FIG. 3 illustrates the example actuator apparatus 200 of FIG. 2 implemented with an example fluid control system or apparatus 300 described herein and depicts the control actuator 202 in an operational state. FIG. 4 depicts the control actuator 202 in a non-operational state.

The example fluid control system 300 is configured to enable normal operation of the control actuator 202 when the control actuator 202 is in an operational state and fluidly couples the control actuator 202 and the override apparatus 226 when the control actuator 202 is in a non-operational state. When the control actuator 202 is in a non-operational state, the fluid control system 300 provides a closed system (e.g., prevents release of a control fluid from the system 300) between the override apparatus 226 and the control actuator 202 (e.g., a chamber of the control actuator 202). As a result, the fluid control system 300 enables the control fluid of the override actuator 226 to flow to the control actuator 202 to provide an increased force (e.g., an increased seat load or opening force) on, for example, a flow control member (e.g., the flow control member 116 of FIG. 1A) of a valve (e.g., the valve 104 of FIG. 1A) when the control actuator 202 is in a non-operational state or a fail condition. Preventing release of the control fluid enables the control actuator to impart the increased force on the flow control member for a significant or extended period of time.

Referring to FIG. 3, the control actuator 202 is in an operational state when the first chamber 208 receives a control fluid (e.g., pressurized air, hydraulic fluid, etc.) via a first port 302 and/or the second chamber 210 receives control fluid via a second port 304 to cause the control actuation member 204 to move between a first surface 306 and a second surface 308. The length of travel of the control actuation member 204 between the first surface 306 and the second surface 308 is a full stroke length of the control actuator 202. In some examples, the full-stroke length of the control actuator 202 may be greater than 8 inches.

The fluid control system 300 includes a passageway 310*a* (e.g., tubing) to fluidly couple a control fluid supply source 312 to the control actuator 202 and a passageway 310*b* to fluidly couple the fluid supply source 312 to the override apparatus 226. The passageway 310*b* includes a one-way valve 314 (e.g., a check valve) that enables the control fluid to flow from the fluid supply source 312 to the third chamber 232 of the override apparatus 226 via a port 316, but prevents fluid flow from the third chamber 232 to the fluid supply source 312. Also, the one-way valve 314 causes the fluid in the third chamber 232 to be in fluid communication with a first fluid control apparatus or valve system 318 via a passageway 320.

In this example, the valve system 318 includes a three-way valve 322 (e.g., a snap-acting three-way valve) and a valve 324. The three-way valve 322 includes a first port 326 fluidly coupled to the passageway 320, a second port 328 fluidly coupled to a passageway 330, and a third port 332 fluidly coupled to a first port 334 of the valve 324 via a passageway 336. A sensing chamber 338 of the three-way valve 322 is in fluid communication with the control fluid in the third chamber 232 via a sensing path 340 to sense the pressure of the control fluid in the third chamber 232. The three-way valve 322 is configured to selectively allow fluid flow between the ports 326 and 328 and prevent fluid flow through the port 332 when the sensing chamber 338 senses a pressure of the control fluid that is greater than a predetermined threshold pressure value (e.g., set by a control spring) of the valve 322. For example, the three-way valve 322 may include a diaphragm and spring actuator configured to move a flow control member of the three-way valve 322 to a first position to allow fluid flow between the ports 326 and 328 and prevent fluid flow through the port 332 over a range of predetermined pressure values sensed by a first side of the diaphragm disposed in the sensing chamber 338. In this manner, pressure fluctuations within the third chamber 232 will cause the three-way valve 322 to prevent fluid flow between the ports 326 and 332 until the pressure within the third chamber 232 is less than a predetermined pre-set pressure set by the spring of the three-way valve 322.

The valve 324 includes a sensing chamber 342 fluidly coupled to the fluid supply source 312 via a sensing pathway 344 and a second port 346. When the control fluid is a pressurized air, the second port 346 may vent to atmospheric pressure. However, in other examples, when the control fluid is a hydraulic fluid, the port 346 may be fluidly coupled to a hydraulic system or reservoir, which may be fluidly coupled to the control fluid supply source 312. In this example, the valve 324 is a fail-to-open valve and enables fluid flow between the first port 334 and the second port 346 when the pressure of the control fluid provided by the fluid supply source 312 in the sensing chamber 342 is less than a predetermined pressure (e.g., set via a biasing element of the valve 324). Thus, in operation, a pressure of the control fluid in the sensing chamber 342 that is greater than the predetermined pressure causes the valve 324 to move to a closed position to prevent fluid flow between the ports 334 and 346.

Also, in this example, the control fluid is fluidly coupled to the control actuator 202 via a control unit or positioner 348. The positioner 348 receives control fluid from the supply source 312 via the passageway 310*a* and provides the control fluid to the first chamber 208 via a passageway 350 and the second chamber 210 via a passageway 352.

A second fluid control apparatus or valve system 354 fluidly couples the positioner 348 to the control actuator 202 when the control actuator 202 is in an operational state and fluidly couples the third chamber 232 and the first chamber 208 when the control actuator 202 is in a non-operational state. In this example, the second valve system 354 is a trip valve 356 (e.g., similar to the trip valve 136 of FIG. 1C). However, in other examples, the second valve system 354 may be a plurality of fluid flow control devices and/or any other suitable valve system to fluidly couple the first and/or second chambers 208 and 210 of the control actuator 202 to the control fluid supply source 312 when the control actuator 202 is in an operational state and to fluidly couple the first chamber 208 and the third chamber 232 to provide a closed fluid system when the control actuator 202 is in a non-operational state. The operation and components of the trip valve 356 are substantially similar to the operation and components of the example trip valve 136 described in connection with FIG. 1C. Thus, the description of the trip valve 354 is not repeated herein. Instead, the interested reader is referred to the above corresponding description in connection with FIG. 1C.

In this example, the trip valve 356 (e.g., via the chambers 170 and 172 of FIG. 1C) is fluidly coupled to the fluid supply source 312 via a passageway 358. In this example, when the trip valve 356 receives control fluid from the supply source 312 via the passageways 358 and 310*a*, the trip valve 356 selectively allows fluid flow between a port A and a port B and prevents fluid flow through a port C, and allows fluid flow between a port D and a port E and prevents fluid flow through a port F. However, when the pressure of the control fluid provided to the trip valve 356 provides a force that is less than a predetermined force (e.g., a force provided by the control spring 154 of FIG. 1C), the trip valve 356 allows fluid flow between the ports B and C and the ports E and F, and prevents fluid flow through the ports A and D. In this example, the port F is fluidly coupled to atmospheric pressure and the port C is fluidly coupled to the second port 328 of the three-way valve 322 via the passageway 330. However, in some examples, if the control fluid is a hydraulic fluid, the port F may be fluidly coupled to a hydraulic system or reservoir and/or the control fluid supply source 312.

In operation, the positioner 348, the trip valve 356 and the third chamber 232 receive pressurized control fluid from the fluid supply source 312 via the respective passageways 310*a*, 358 and 310*b*. When the pressure of the control fluid is greater than a predetermined pressure value of the trip valve 356, the trip valve 356 allows fluid flow between the ports A and B and the ports D and E and prevents fluid flow through the ports C and F. Also, a pressure of the control fluid that exerts a force against the first side 236 of the override actuation member 230 that is greater than the force exerted on the second side 240 of the override actuation member 230 provided by the spring 238 causes the override apparatus 206 to move to a stored position as shown in FIG. 3.

In this example, the positioner 348 provides (i.e., supplies) the control fluid (e.g., air) to the control actuator 202 to position a flow control member of a valve coupled to the actuator assembly 200 to a desired position to regulate the flow of fluid through the valve. The desired position may be provided by a signal from a sensor (e.g., a feedback sensor), a control room, etc. For example, a feedback sensor (not shown) may be configured to provide a signal (e.g., a mechanical signal, an electrical signal, etc.) to the positioner 348 to indicate the position of the control actuator 202 and, thus, the flow control member of the valve. In operation, the positioner 348 may be operatively coupled to the feedback sensor via a servo and configured to receive the signal from the feedback sensor to control the amount of control fluid to be supplied to the first and/or second chambers 208 and 210 based on the signal provided by the feedback sensor.

The positioner 348 supplies control fluid to, or exhausts control fluid from, the first chamber 208 and/or the second chamber 210 via respective passages 350 and 352 to create a pressure differential across the control actuation member 204 to move the control actuation member 204 in either a first direction toward the surface 308 or a second direction opposite the first direction toward the surface 306. The positioner 348 provides or supplies the control fluid (e.g., pressurized air, hydraulic oil, etc.) to the first and/or second chambers 208 and 210 based on the signal provided by the feedback sensor. As a result, the pressure differential across the control actuation member 204 moves the control actuation member 204 to vary the position of a flow control member (e.g., the flow control member 116 of FIG. 1A) between a closed position at which the flow control member is in sealing engagement with a valve seat (e.g., the valve seat 108) and a fully open or maximum flow rate position at which the flow control member is spaced or separated from the valve seat.

Additionally, during normal operation, the third chamber 232 may continuously receive control fluid from the control fluid supply source 312 via the passageway **310*b* and the third port 316. The control fluid exerts a force on the first side 236 of the override actuation member 230 to maintain or bias the override actuation member 230 in the stored position against the force of the biasing element 238 when the control actuation member 204 is in an operational state. The fourth chamber 234 may include a vent 360, which may vent to atmospheric pressure so that the control fluid in the third chamber 232 need only overcome the force of the biasing element 238 to move the override apparatus 226 to the stored position of FIG. 3**.

At the stored position, the override actuation member 230 and the canister 248 move toward the spring seat 246 until the canister 248 engages the spring seat 246. In this manner, the spring seat 246 provides a travel stop to prevent damage to the biasing element 238 due to over pressurization of fluid in the third chamber 232. In other words, the spring seat 246 prevents the biasing element 238 from compressing in a direction toward the spring seat 246 beyond the stored position shown in FIG. 3.

In the illustrated example, the coupling member 256 moves between a first position and a second position that correspond to the first and the second positions of the control actuation member 204 and does not engage the override apparatus 226 when the override actuation member 230 is in the stored position. In this example, the coupling member 256 moves between a surface 362 of the canister 248 and the second side 240 of the override actuation member 230 when the control actuator 202 is in an operational state. The override apparatus 226 does not act upon, interfere with or otherwise affect the control actuator 202 when the control actuator 202 is in the operational state. In other words, the control actuator 202 does not have to overcome the spring force of the biasing element 238 when the control actuator 202 is in an operational state.

Referring to FIG. 4, during emergency situations (e.g., when the control fluid supply source 312 fails), the control actuator 202 is in a non-operational state and the trip valve 356 allows fluid flow between the ports B and C and the ports E and F and prevents fluid flow through the ports A and D. As a result, the control fluid in the second chamber 210 is exhausted or vented to the atmosphere via a first portion 364 of the passageway 352 and the ports E and F of the trip valve 356.

In the non-operational state, the override apparatus 226 activates when control fluid in the third chamber 232 has a pressure that provides a force that is less than a force exerted by the biasing element 238. The override actuation member 230 moves toward the surface 262 due to the force imparted by the biasing element 238 on the second side 240 of the override actuation member 230. In other words, the override apparatus 226 activates to cause the override actuation member 230 to move in the second direction (e.g., toward the surface 262 in the orientation of FIG. 4) to a predetermined or fail position when the control fluid supply source 312 fails to provide properly pressurized control fluid to the third chamber 232.

The canister 248 slides along the rods 250 with the override actuation member 230 as the override actuation member 230 moves to the predetermined failure or override position (toward the surface 262) as the biasing element 238 expands to drive the override actuation member 230 to the predetermined position. In this example, the surface 362 of the canister 248 engages the lip portion 260 of the coupling member 256 to operatively couple the override actuation member 230 to the control actuation member 204 as the override actuation member 230 moves in the second direction toward the surface 262. In turn, the engagement of the coupling member 256 and the canister 248 causes the control actuator 202 to move to the predetermined failure or override position.

Thus, the example fluid control system 300 described herein causes the override apparatus 226 to act upon the control actuation member 204 when the control fluid supply source 312 fails or is shut down. In other examples, the override apparatus 226 may be activated as a fail-safe device upon a detected loss of supply fluid or, more generally, in any situation as desired. That is, for any situation in which activating the override apparatus 226 is needed or desired, a solenoid valve, for example, may be activated to invoke an override or fail-safe condition.

Upon failure or disconnection of the control fluid from the fluid control system 300 (i.e., when the supply pressure is lost), the check valve 314 prevents fluid flow from the third chamber 232 to the control fluid supply source 312 via the passageway **310*b* and thereby causes the control fluid to flow to the port 326 of the three-way valve 322 via the passageway 320. Although the valve 324 (e.g., a fail to open valve) may be configured to move to an open position to allow fluid flow between the ports 334 and 346 upon a failure, the three-way valve 322 allows fluid flow between the ports 326 and 328 and prevents fluid flow through port 332 until the pressure of the control fluid in the third chamber 232 is below the predetermined pressure value. In other words, the three-way valve 322 allows the control fluid to flow to the passageway 330 as the override actuation member 230 moves toward the surface 262. Because the trip valve 356 is configured to allow fluid flow between the ports C and B, the control fluid is routed to the first chamber 208 of the control actuator 202 via a first portion 368 of the passageway 350. Additionally, a closed fluid path is provided between the third chamber 232 and the first chamber 208 when the control fluid supply source 312 has failed and the control actuator 202 is in a non-operational condition. In other words, the control fluid can only flow between the third chamber 232 and the first chamber 208 via a path formed by the pathways 320, 330 and 368, 350 and the valves 322 and 356**.

As the biasing element 238 expands to cause the override apparatus 226 and, thus, the control actuator 202 to move to the predetermined failure or override position, the control fluid in the third chamber 232 flows to the first chamber 208 of the control actuator 202. The pressure of the control fluid increases in the first chamber 208 because the first chamber 208 has a volume that is less than the volume of the third chamber 232 (and the temperature of the control fluid remains substantially constant). Additionally, as the control fluid flows to the first chamber 208, the pressure of the control fluid in the third chamber 232 decreases.

As the pressure of the control fluid in the third chamber 232 decreases below the predetermined pressure value of the three-way valve 322 as the control fluid is routed to the first chamber 208, the three-way valve 322 moves to a second position to allow fluid flow between the ports 326 and 332 and prevent fluid flow through the port 328. Thus, the three-way valve 322 provides a closed system and prevents fluid from the first chamber 208 from flowing through the three-way valve 322. Additionally, any remaining fluid in the third chamber 232 is vented through the port 346 of valve 324 because the valve 324 moves to an open position when the control fluid supply source 312 fails (e.g., when the pressure of the control fluid is less than a predetermined pressure value of the valve 324).

The pressure of the control fluid in the first chamber 208 acts on a first side 370 of the control actuation member 204, thereby increasing the force (e.g., seat load or opening force) provided or exerted by the control actuation member 204 in a direction toward the override apparatus 226. For example, when the flow control member 116 of the valve 104 of FIG. 1A sealingly engages the valve seat 108 in the closed position, a pressurized process fluid at the inlet 112 of the valve 104 acts upon the flow control member 116 which, depending on its pressure, may cause the flow control member 116 to move away from the valve seat 108. The pressure of the control fluid acting on the first side 370 of the control actuation member 204 provides additional seat load (e.g., a force toward the valve seat 108), along with the force provided by the spring 238, to prevent the pressurized process fluid at the inlet 112 from moving the flow control member 116 away from and out of sealing engagement with the valve seat 108 when the valve 104 is in the closed position. Also, because the fluid control system 300 provides a closed system when the control actuator 202 is in the non-operational condition (i.e., prevents release of the control fluid from the first chamber 208 control actuator 202), the control fluid system 300 can provide an increased seat load on the flow control member 116 for a substantial period of time.

The example fluid control system 300 may be configured with any other type of control actuator and/or valve such as, for example, a diaphragm and spring actuator or a push-to-open valve. For example, when coupled with a push-to-open valve, the passageway 330 may be coupled to the port F of the trip valve 356 and the port C may be coupled to atmospheric pressure such that in a fail condition, the control fluid in the third chamber 232 is routed to the second chamber 210 of the control actuator 202. In this configuration, the orientation of the override apparatus 226 is reversed such that the biasing element 238 causes the piston 230 to move toward the surface 306 during, for example, a fail condition. In such a configuration, the control fluid in the second chamber 210 increases the opening force to be exerted by the control actuator 202 to enable the flow control member to move away from the valve seat against the force of the pressurized process fluid at the inlet of the valve.

FIG. 5 illustrates the example actuator apparatus 200 of FIG. 2 implemented with another example fluid control system or apparatus 500. Those components of the example fluid control system 500 of FIG. 5 that are substantially similar or identical to those components of the example fluid control system 300 described above will not be described in detail again below. Instead, the interested reader is referred to the above corresponding descriptions in connection with FIGS. 3-4. Those components that are substantially similar or identical will be referenced with the same reference numbers as those components described in connection with FIGS. 3-4.

In the illustrated example, the fluid control system 500 is implemented with a valve system 501 that includes a plurality of valves instead of the trip valve 356 as shown in FIGS. 3-4. As shown in FIG. 5, the plurality of valves includes a first three-way valve 502, a second three-way valve 504 and a third three-way 506. However, in other examples, the valve system 501 may include only one three-way valve, other flow control devices fluidly coupled in series, in parallel, etc., and/or any other suitable fluid control devices or systems.

In this example, a sensing chamber 508 of the first valve 502 is fluidly coupled to the fluid supply source 312 via a passageway 510*a* and a sensing chamber 512 of the second valve 504 is fluidly coupled to the fluid supply source 312 via a passageway 510*b* and the passageway 510*a*. A sensing chamber 514 of the third valve 506 is fluidly coupled to the fluid supply source 312 via a passageway 510*c* and the passageway 510*a*.

A first port 516 of the first valve 502 is fluidly coupled to the fluid supply source 312 via a passageway 518, a second port 520 is fluidly coupled to the positioner 348 via a passageway 522, and a third port 524 of the first valve 502 is fluidly coupled to a first port 526 of the second valve 504 via a passageway 528. A second port 530 and a third port 532 of the second valve 504 fluidly couples the positioner 348 to the first chamber 208 via a passageway 534. Similarly, a first port 536 and a second port 538 of the third valve 506 fluidly couple the positioner 348 to the second chamber 210 of the control actuator 202 via a passageway 540. In this example, a third port 542 of the third valve 506 is fluidly coupled to atmospheric pressure. The passageway 518 includes a one-way valve 544 that allows fluid flow from the fluid supply source 312 to the first port 516 of the first valve 502, but prevents fluid flow from the first valve 502 to the fluid supply source 312.

In operation, when the pressure of the control fluid sensed by the sensing chamber 508 is greater than a predetermined pressure set by the first valve 502 (e.g., set via a control spring), the first valve 502 selectively enables fluid flow between the ports 516 and 520 and prevents fluid flow through the port 524. In other words, the first valve 502 causes the control fluid from the fluid supply source 312 to be fluidly coupled to the positioner 348 via the passageways 510*a* and 522. Similarly, when the sensing chamber 512 senses a pressure that is greater than a predetermined value (e.g., set via a control spring) of the second valve 504, the second valve 504 allows fluid flow between the ports 530 and 532 to fluidly couple the positioner 348 to the first chamber 208 and prevents fluid flow through the port 526. Also, when the sensing chamber 514 of the third valve 506 senses a pressure from the fluid supply source 312 that is greater than a predetermined pressure (e.g., set via a control spring) of the third valve 506, the third valve 506 allows fluid flow between the ports 536 and 538 to fluidly couple the positioner 348 to the second chamber 210 and prevents fluid flow through the port 542. In other words, when the sensing chambers 508, 512 and 514 sense a pressure that is greater than the predetermined pressure values set by the respective valves 502, 504, and 506, the control actuator 202 is in an operational state or condition.

In an operational state, the positioner 348 supplies control fluid to, or exhausts control fluid from, the first chamber 208 and/or the second chamber 210 via respective passages 534 and 540 to create a pressure differential across the control actuation member 204 to move the control actuation member 204 in either a first direction toward the surface 308 or a second direction opposite the first direction toward the surface 306. As a result, the pressure differential across the control actuation member 204 moves the control actuation member 204 to vary the position of a flow control member (e.g., the flow control member 116 of FIG. 1A) between a closed position at which the flow control member is in sealing engagement with a valve seat (e.g., the valve seat 108) and a fully open or maximum flow rate position at which the flow control member is spaced or separated from the valve seat.

Also, as noted above, the three-way valve 322 allows fluid flow between the ports 326 and 328 and prevents fluid flow through the port 332 when the sensing chamber 338 senses a pressure that is greater than a predetermined pressure value set by the valve 322 (i.e., when the control actuator 202 is in an operational state). Additionally, during normal operation, the third chamber 232 may continuously receive control fluid from the control fluid supply source 312 via the passageway 310*b* to maintain or bias the override actuation member 230 in the stored position against the force of the biasing element 238 when the control actuation member 204 is in an operational state.

In a non-operational state, (e.g., when the control fluid supply source 312 fails), the valve systems 318 and 501 provide a closed loop fluid path between the third chamber 232 of the override apparatus 226 and the first chamber 208 of the control actuator 202. In particular, when the sensing chamber 508 of the first valve 502 senses a pressure that is less than the predetermined pressure, the first valve 502 allows fluid flow between the ports 516 and 524 and prevents fluid flow through the port 520 (and to the positioner 348). Similarly, the second valve 504 allows fluid flow between the ports 526 and 532 and prevents fluid flow through the port 530 when the sensing chamber 512 senses a pressure that is less than the predetermined pressure set by the second valve 504 (i.e., when the fluid supply source 312 fails).

Also, in the non-operational state, the override apparatus 226 activates and moves the override actuation member 230 and, thus, the control actuator 202 to a predetermined or fail position toward the surface 262 when the control fluid supply source 312 fails to provide properly pressurized control fluid to the third chamber 232. In turn, the override actuation member 230 causes the control actuator 202 to move to the predetermined failure or override position. As the control actuation member 204 moves toward the surface 308 to its fail position, the fluid within the second chamber 210 is vented via the third valve 506 because the third valve 506 is configured to allow fluid flow between the ports 538 and 542 and prevent fluid flow through the port 536 when the sensing chamber 514 senses a pressure that is less than the predetermined pressure set by the third valve 506 (i.e., when the fluid supply source 312 fails).

Upon failure or disconnection of the control fluid from the fluid control system 500 (i.e., when the supply pressure is lost), the check valve 314 prevents fluid flow from the third chamber 232 to the control fluid supply source 312 via the passageway 310*b* and thereby causes the control fluid to flow to the port 326 of the valve 322. The valve 322 allows fluid flow between the ports 326 and 328 and prevents fluid flow through the port 332 until the pressure of the control fluid in the third chamber 232 is below the predetermined pressure value. Therefore, the valve 322 allows the control fluid to flow to the passageway 518 as the override actuation member 230 moves toward the surface 262. Because the first valve 502 is configured to allow fluid flow between the ports 516 and 524 and the second valve 504 is configured to allow fluid flow between the ports 526 and 532 when the control actuator 202 is in a non-operational state, the control fluid in the third chamber 232 is routed to the first chamber 208 of the control actuator 202 via passageways 320, 518, 528 and 534.

Additionally, a closed fluid path is provided between the third chamber 232 and the first chamber 208 when the control fluid supply source 312 has failed and the control actuator 202 is in a non-operational condition. In other words, the control fluid can only flow between the third chamber 232 and the first chamber 208 via a path formed by the pathways 320, 518, 528 and 534 and the valves 322, 502 and 504. Further, the control fluid is prevented from flowing from the passageway 518 to the fluid supply source 312 via the one-way valve 544.

As the control actuator 202 moves to the predetermined failure or override position, the control fluid in the third chamber 232 flows to the first chamber 208 of the control actuator 202. Additionally, as the control fluid flows to the first chamber 208, the pressure of the control fluid in the third chamber 232 decreases. As the pressure of the control fluid in the third chamber 232 decreases below the predetermined pressure value of the valve 322 as the control fluid is routed to the first chamber 208, the valve 322 moves to a second position to allow fluid flow between the ports 326 and 332 and prevent fluid flow through the port 328. Thus, the valve 322 provides a closed system and prevents fluid from the first chamber 208 from flowing through the three-way valve 322. Additionally, any remaining fluid in the third chamber 232 is vented through the port 346 of the valve 324 because the valve 324 is configured to move to an open position when the control fluid supply source 312 fails (e.g., when the pressure of the control fluid is less than a predetermined pressure value of the valve 324).

The example apparatus described herein may be factory installed or may be retrofitted to existing actuators (e.g., the actuator 104) that are already field installed.

Although certain example apparatus have been described herein, the scope of coverage of this patent is not limited thereto. On the contrary, this patent covers all methods, apparatus, and articles of manufacture fairly falling within the scope of the appended claims either literally or under the doctrine of equivalents.

What is claimed is:

1. A fluid control system for use with valves, comprising:

a first fluid control apparatus to fluidly couple a control fluid supply source to a control actuator via a first passageway, wherein the control fluid supply source provides a control fluid to move a control actuator member of the control actuator in a first direction or a second direction opposite the first direction when the control actuator is in an operational state; and a second fluid control apparatus in fluid communication with the first fluid control apparatus via a second passageway, the second passageway configured to fluidly couple an override actuator and the control actuator when the control actuator is in a non-operational state such that control fluid flows from the override actuator to the control actuator and a portion of the second passageway captures a fluid pressure in the control actuator when the fluid pressure in the override actuator is less than a predetermined value.

2. A fluid control system of claim 1, further comprising a third fluid passageway to fluidly couple the control fluid supply source to the override actuator to cause the override actuator to move to a stored position when the control actuator is in the operational state.

3. A fluid control system of claim 1, wherein the first fluid control apparatus comprises a first valve system to fluidly couple the control fluid supply source and the control actuator when the control actuator is in an operational state and to fluidly couple the override actuator and the control actuator when the control actuator is in a non-operational state.

4. A fluid control system of claim 3, wherein the first valve system comprises a trip valve, wherein the trip valve allows fluid flow between the first passageway and a first chamber or a second chamber of the control actuator and prevents fluid flow between the second passageway and the first chamber of the control actuator when the control actuator is in the operational state.

5. A fluid control system of claim 4, wherein the trip valve allows fluid flow between the third passageway and the first chamber of the control actuator and prevents fluid flow between the first passageway and the first chamber or the second chamber of the control actuator when the control actuator is in the non-operational state.

6. A fluid control system of claim 3, wherein the first valve system comprises a plurality of three-way valves.

7. A fluid control system for use with valves, comprising:

a first fluid control apparatus to fluidly couple a control fluid supply source to a control actuator via a first passageway, the control fluid supply source to provide a control fluid to move a control actuator member of the control actuator in a first direction or a second direction opposite the first direction when the control actuator is in an operational state, the first fluid control apparatus having a first valve system to fluidly couple the control fluid supply source and the control actuator when the control actuator is in the operational state and to fluidly couple an override actuator and the control actuator when the control actuator is in a non-operational state, the first valve system comprising a plurality of three-way valves; and a second fluid control apparatus in fluid communication with the first fluid control apparatus and configured to fluidly couple the override actuator to the control actuator via a second passageway when the control actuator is in the non-operational state, wherein the override actuator is operatively coupled to the control actuator, and wherein, when the control actuator is in the operational state, a first valve of the plurality of valves allows fluid flow between the first passageway and a control unit, a second valve of the plurality of valves allows fluid flow between a first output of the control unit and a first chamber of the control actuator, and a third valve of the plurality of valves allows fluid flow between a second output of the control unit and a second chamber of the control actuator.

8. A fluid control system of claim 7 wherein, when the control actuator is in a non-operational state, the first valve of the plurality of valves is configured to allow fluid flow between the second passageway and the second valve of the plurality of valves and prevent fluid flow to the control unit, and the second valve of the plurality of valves is configured to allow fluid flow from the second passageway to the first chamber of the control actuator and prevent fluid flow between the first chamber and the control unit.

9. A fluid control system for use with valves, comprising:

a first fluid control apparatus to fluidly couple a control fluid supply source to a control actuator via a first passageway, the control fluid supply source to provide a control fluid to move a control actuator member of the control actuator in a first direction or a second direction opposite the first direction when the control actuator is in an operational state; and a second fluid control apparatus in fluid communication with the first fluid control apparatus and configured to fluidly couple an override actuator to the control actuator via a second passageway when the control actuator is in a non-operational state, wherein the override actuator is operatively coupled to the control actuator, the second fluid control apparatus having a valve system disposed along the second passageway between the override actuator and the first fluid control apparatus to selectively enable control fluid in the override actuator to flow to the first fluid control apparatus when the pressure of the control fluid in the override actuator is greater than a predetermined pressure value, and wherein the second valve system selectively enables the control fluid within the override actuator to vent to the atmosphere when the pressure of the control fluid in the override actuator is below a predetermined value.

10. A fluid control system of claim 9, wherein the valve system comprises a three-way valve having a first port fluidly coupled to a third chamber of the override actuator, a second port fluidly coupled to the first fluid control apparatus, and a third port in fluid communication with the atmosphere.

11. A fluid control system, comprising;

a passageway to fluidly couple a control fluid to a control actuator and to an override actuator operatively coupled to the control actuator, wherein the control fluid causes the override actuator to move to a stored position and causes the control actuator to move between a first position and a second position when the control actuator is in an operational state; and a fluid control apparatus coupled to the passageway to prevent fluid flow between the control actuator and the override actuator when the control actuator is in the operational state and to fluidly couple the override actuator to the control actuator to enable fluid flow between the control actuator and the override actuator when the control actuator is in a non-operational state so that the control fluid from the override actuator acts upon the control actuator to increase a force provided by the control actuator when the control actuator is in a non-operational state.

12. A fluid control system of claim 11, wherein the fluid control apparatus comprises a first valve system in fluid communication with a second valve system, wherein the first valve system is disposed between a control fluid supply source and a first chamber of the control actuator, wherein the first valve system selectively provides the control fluid to the first chamber and prevents fluid flow between the override actuator and the first chamber of the control actuator when the control actuator is in the operational state.

13. A fluid control system of claim 12, wherein the second valve system enables the control fluid to flow from the override actuator to the first chamber of the control actuator when the control actuator is in the non-operational state and allows the control fluid within the override actuator to vent to the atmosphere when the pressure of the control fluid in the override actuator is below a predetermined pressure.

14. A fluid control system of claim 13, wherein the second valve system comprises a three-way valve having a first port in fluid communication with the fluid supply source and the override actuator, a second port in fluid communication with the first valve system, and a third port in fluid communication with the atmosphere.

15. A fluid control system of claim 14, further comprising a one-way valve disposed between the override actuator and the control fluid supply source to prevent fluid flow from the override actuator to the control fluid supply source and direct the fluid from the override actuator to the first port.

16. A fluid control system of claim 12, wherein the first valve system comprises a trip valve disposed between the control fluid supply source and the control actuator, wherein the trip valve is configured to selectively allow fluid flow between the control fluid supply source and the first chamber of the control actuator and prevent fluid flow from the second valve system to the first chamber of the control actuator when the control actuator is in the operational state, and wherein the trip valve is configured to selectively prevent fluid flow between the control fluid supply source and the first chamber and allow fluid flow from the first valve system to the first chamber when the control actuator is in the non-operational state.

17. A fluid control system of claim 12, wherein the first valve system comprises at least one three-way valve, wherein the at least one three-way valve is configured to selectively enable fluid flow between the control fluid supply source and the first chamber of the control actuator and prevent fluid flow between the override actuator and the first chamber when the control actuator is in the operational state, and wherein the at least the three-way valve is configured to selectively enable fluid flow between the override actuator and the first chamber and prevent fluid flow between the control fluid supply source and the first chamber when the control actuator is in the non-operational state.

18. A fluid control system comprising:

first means for fluidly coupling a pressurized control fluid to a control actuator when the control actuator is in an operational state, wherein the control fluid is to cause the control actuator to move between a first position and a second position; and second means for fluidly coupling the pressurized control fluid to an override apparatus to cause the override apparatus to move to a stored position when the control actuator is in the operational state, wherein the second means for fluidly coupling selectively enables fluid flow from the override apparatus to the first means for fluidly coupling, and wherein the first means for fluidly coupling selectively enables fluid flow from the second means for fluidly coupling to the control actuator when the control actuator is in a non-operational state, and wherein the second means for fluidly coupling captures a fluid pressure in the control actuator when the control actuator is in the non-operational state and when fluid pressure in the override actuator is less than a predetermined pressure.

19. A fluid system of claim 18, wherein the first means for fluidly coupling comprises a means for moving a first flow control member between a first position to allow the control fluid to flow from the control fluid supply source to the control actuator via a first passageway and prevent the control fluid from flowing from the override apparatus to the control actuator via a second passageway when the control actuator is in an operational state, and a second position to allow the control fluid to flow from the override apparatus to the control actuator via the second passageway when the control actuator is in a nonoperational state.

20. A fluid system of claim 18, wherein the second means for fluidly coupling comprises a means for moving a second flow control member between a first position to allow the control fluid to flow from the override actuator to the control actuator when the pressure of the control fluid in the override actuator is greater than a predetermined pressure value, and a second position to prevent the control fluid from flowing from the override actuator to the control actuator when the pressure of the control fluid in the override actuator is below the predetermined pressure value.

* * * * *